UNITED STATES PATENT OFFICE.

SAMUEL BERGHEIM, OF LONDON, ENGLAND.

METHOD OF PREPARING MEAT EXTRACTS.

SPECIFICATION forming part of Letters Patent No. 658,887, dated October 2, 1900.

Application filed May 1, 1900. Serial No. 15,118. (No specimens.)

*To all whom it may concern:*

Be it known that I, SAMUEL BERGHEIM, merchant, a subject of the Emperor of Germany, residing at 41 Norfolk Square, Paddington, London, England, have invented certain new and useful Improvements in and Relating to Meat Extracts and Processes of Preparing the Same; and I do hereby declare the following to be a full, clear, and exact description thereof.

This invention relates to improvements in and relating to meat extracts and the preparation of the same; and it has for its object to overcome the difficulty at present existing whereby it is not possible to retain in admixture with prepared meat extracts more than approximately five (5) per cent. of albumen, it being well known that any excess of the albumen above this quantity, instead of combining with the said extract, is precipitated, and, further, in some cases when the extract is dissolved to form soup the albumen is liable to separate or coagulate.

To overcome these difficulties and at the same time to allow of the ready admixture and retention of any desired proportion of albumen, I boil albumen in a suitable quantity of water in either a steam or water jacketed pan or other suitable vessel until the mixture has jellified. I next boil the meat extract in another vessel and add thereto gelatine dissolved in water. This latter mixture I now add slowly to the jellified albumen prepared as before described and keep the mixture boiling and constantly stirred until the same attains a consistency equal to that of cream, after which the heat is gradually reduced and the preparation allowed to cool slowly.

As an example of the proportions which may be employed I may take, say, soluble albumen, sixty parts; meat extract, thirty-five parts, and gelatine five parts, although it will be evident that such proportions will of necessity vary in accordance with the quantity of albumen it is desired to retain in the finished extract.

Having now particularly described and ascertained the nature of my said invention and in what manner the same is to be performed, I declare that what I claim is—

The process of preparing meat extracts, whereby it is possible to incorporate therewith albumen varying in proportion from five (5) per cent. upward, which consists in first boiling the albumen in water until it is jellified; boiling the meat extract and adding thereto gelatine dissolved in water; and then adding the jellified albumen, prepared as above, to the meat extract, and stirring the mixture until the same attains a consistency equal to cream; and finally gradually reducing the heat and permitting the preparation to cool.

In witness whereof I have hereunto set my hand, in presence of two witnesses, at London, England, April 19, 1900.

SAMUEL BERGHEIM.

Witnesses:
W. M. HARRIS,
WALTER J. SKERTEN.